(12) United States Patent
Bewer et al.

(10) Patent No.: US 11,629,086 B2
(45) Date of Patent: Apr. 18, 2023

(54) GLASS FORMING MACHINE COMPRISING A SWABBING STATION AND METHOD

(71) Applicant: Emhart Glass SA, Steinhausen (CH)

(72) Inventors: Thomas Alexander Bewer, Richterswil (CH); Leo Diehm, Cham (CH); Inge Ulf Friberg, Malmö (SE); Martin Gronblad, Sundsvall (SE)

(73) Assignee: Emhart Glass SA

( * ) Notice: Subject to any disclaimer, the term of this patent is extended or adjusted under 35 U.S.C. 154(b) by 161 days.

(21) Appl. No.: 16/840,919

(22) Filed: Apr. 6, 2020

(65) Prior Publication Data
US 2020/0369548 A1 Nov. 26, 2020

(30) Foreign Application Priority Data
May 21, 2019 (EP) ..................... 19175792

(51) Int. Cl.
*C03B 9/193* (2006.01)
*C03B 9/40* (2006.01)
*C03B 9/34* (2006.01)

(52) U.S. Cl.
CPC .............. *C03B 9/1932* (2013.01); *C03B 9/34* (2013.01); *C03B 9/40* (2013.01)

(58) Field of Classification Search
None
See application file for complete search history.

(56) References Cited

U.S. PATENT DOCUMENTS

| 4,409,010 A | 10/1983 | Brown | |
|---|---|---|---|
| 5,814,119 A * | 9/1998 | Jones | C03B 9/165 65/235 |
| 5,893,942 A * | 4/1999 | Nickey | C03B 9/165 65/235 |
| 2009/0061100 A1* | 3/2009 | Donges | C03B 40/027 118/317 |
| 2009/0173105 A1* | 7/2009 | Zanella | C03B 40/027 65/159 |
| 2017/0313614 A1* | 11/2017 | Röhrhoff | B01D 46/10 |
| 2018/0105456 A1* | 4/2018 | Wang | C03B 9/44 |
| 2018/0201537 A1 | 7/2018 | Valli et al. | |

FOREIGN PATENT DOCUMENTS

| JP | S58204829 A | 11/1983 |
| WO | 2007138226 A1 | 12/2007 |
| WO | 2017032883 A1 | 3/2017 |

* cited by examiner

*Primary Examiner* — Queenie S Dehghan
(74) *Attorney, Agent, or Firm* — Endurance Law Group PLC (57) ABSTRACT

The invention refers to a glass forming machine which includes a blank station for forming a parison (14) from a gob of molten glass (9) and a blow station for forming the parison (14) into a container (26) and an invert mechanism (16) which can move a neck ring (5) from the blank station to the blow station by a rotary motion and which further includes a swab robot and a control device for the swab robot, wherein the control device is set up so that the swab robot can swab and thus swab the neck ring (5) when the neck ring (5) is in an intermediate position between the blank station and the blow station. Defects in the production of bottles can thus be avoided.

17 Claims, 8 Drawing Sheets

GLASS FORMING MACHINE COMPRISING A SWABBING STATION AND METHOD

CROSS REFERENCE TO RELATED APPLICATIONS

This application claims priority to European Patent Application EP 19175792.1 filed on May 21, 2019, the entire disclosure of which is hereby incorporated by reference and relied upon.

BACKGROUND OF THE INVENTION

Field of the Invention

The invention relates generally to a glass forming machine which includes a blank station for forming a parison from a gob of molten glass and a blow station for forming a container from the parison. Further, the glass forming machine comprises an invert mechanism which transfers the parison from the blank station to the blow station. The invention refers in addition to a method for swabbing or replacing a neck ring of a glass forming machine

Description of Related Art

The container can be a glass bottle. The transfer can take place through a rotational movement.

The blank station can comprise at least one blank mold. The blank mold can include two blank mold halves. The blank mold halves can be moved back and forth between an open position and a closed position. There may be a neck ring below the blank mold.

A gob of molten glass can be brought into the blank mold from above. The upper opening of the blank mold can be closed by a baffle.

The blank station can also include a plunger. There may be a plunger. The plunger may reach through the neck ring. The plunger can be moved into the blank mold. The plunger can be moved out of the blank mold. Thus, the plunger can come from below through the neck ring moving into the blank mold. The ascending movement of the plunger can pierce a gob of molten glass when a molten gob is within the blank mold and when the upper opening of the blank mold is closed. The blank station can form a parison in this way.

After forming the parison, the plunger will be moved downwards out of the blank mold. The upper opening and the blank mold will be opened. The two mold halves will be moved to their open position. The parison is then held only by the neck ring.

When the parison is only held by the neck ring, the invert mechanism can transfer the neck ring together with the parison to the blow station. This is done, for example, by turning the neck ring 180 degrees about a horizontal axis. The neck ring can be attached to a shaft respectively an axis via an arm so that it can be rotated appropriately. When the shaft is rotated 180 degrees, the neck ring is transported from the blank station to the blow station and is rotated 180 degrees.

The blow station can form a finished product out of the parison. The forming of the parison into a finished product is accomplished in three phases: stretching of the parison under its own weight; inflation of the stretched parison; and extraction of the finished product. The finished product is a container like a bottle.

The blow station can comprise a blow mold which may include two blow mold halves. The blow station can include a blowing device to blow up a parison when the parison is in the blow mold. The blow station may include a suction device to assist blowing. The blow mold may include a double wall, leaving a gap between the two walls of the double wall. The inner wall of the double wall can be permeable to air.

A major source of the visible defects on the surface of the finished product arises from the relatively violent contact of the parison with the surface of the blank mold cavity during charging. To eliminate these defects, document WO 2007/138226 A1 teaches to swab a mold. An apparatus which can swab a mold comprises a spray tube which is carried by a swab robot that can move alongside the blank mold. Swabbing of a blank mold is also known from WO 2017/032883 A1. U.S. Pat. No. 4,409,010 discloses an apparatus for spraying lubricant onto the blank molds of an IS glass forming machine. JP S58 204829 A discloses a mechanism in order to carry out the application of lubricant to a rough mold of a glass forming machine.

To avoid defects, it is also necessary to replace the neck ring from time to time. It may also be necessary to replace the neck ring if the shape of a bottle is to be changed.

It is the object of the invention to avoid defects in the production of containers.

The object of the invention is solved by the subject matter of claim 1. The object of the invention is also solved by the subject matters of the independent claims. The sub-claims refer to improved embodiments.

The object of the invention is solved by a glass forming machine which can include a blank station for forming a parison from a gob of molten glass and a blow station for forming a parison into a container. The glass forming machine can comprise an invert mechanism which can move a neck ring from the blank station to the blow station by a rotary motion. The glass forming machine can include a swab robot of a swabbing station and a control device for the swab robot. The control device can be set up so that the swab robot can swab and thus swab the neck ring if the neck ring has been removed from the blank station but has not yet reached the blow station and is thus in an intermediate position. In other words, when the neck ring is swabbed, it is between the two stations.

Swabbing in an intermediate position prevents residues on any mechanism of the glass forming machine. The inventors found that avoiding residues on any mechanism (especially a plunger mechanism) avoids the risk of creating container defects.

Preferably there are two intermediate positions for swabbing the neck ring in order to solve the object in an improved manner. In the first intermediate position, the neck ring is swabbed from a front side. In the second intermediate position, the neck ring is swabbed from a back side.

BRIEF SUMMARY OF THE INVENTION

In a preferred embodiment of the invention, the control device is set up so that the control device stops the neck ring in at least one intermediate position, preferably in said two intermediate positions. It can then be swabbed particularly reliably. The number of defects can thus be further reduced.

In a preferred embodiment of the invention, the control device is set up so that the control device reduces the speed of the neck ring in at least one intermediate position, preferably in said two intermediate positions. The neck ring is thus moved at a first speed. When the neck ring approaches an intermediate position, the speed is reduced and the neck ring is moved with a second speed. When the neck ring reaches the intermediate position, the ring is moved at the second speed. The second speed is lower than the first speed. After swabbing, the neck ring can be moved again at the first speed. The speed can therefore be increased again after the swabbing. It can then be swabbed particularly reliably. The number of defects can thus be further reduced.

In an embodiment of the invention, there is at least one position sensor which can detect at least one intermediate position of the neck ring. The control device is set up so that the control device stops the neck ring as soon as the position sensor detects that the neck ring has reached the corresponding intermediate position.

In a preferred embodiment of the invention, the invert mechanism includes a servo-electric drive. The servo-electric drive transports the neck ring back and forth between the two stations. With little technical effort, the neck ring can be transported back and forth between the two stations. In addition, the movement of the neck ring can be suitably stopped when an intermediate position is reached. No position sensor is needed in this embodiment of the invention as the encoder of the servo-electric drive can be used.

When the neck ring has stopped in an intermediate position or when the neck ring is moved at an intermediate position with the reduced second speed, a swab robot swabs and thus lubricates the neck ring in this position. This avoids residues on any mechanism of the machine.

In an embodiment of the invention, the control device is set up so that the control device stops the neck ring or reduces the speed of the neck ring when an arm holding the neck ring has been swiveled by 10° to 90°, preferably by 20° to 80°, more preferably by 30° to 70°, for swabbing the neck ring from a front side. Before the swivel, the arm was at the blank station.

In an embodiment of the invention, the control device is set up so that the control device stops or reduces the speed of the neck ring the neck ring when an arm holding the neck ring has been swiveled by 90° to 170°, preferably by 100° to 160°, more preferably by 110° to 150°, for swabbing the neck ring from a back side. Before the swivel, the arm was at the blank station. The swivel by 90° to 170°, preferably by 100° to 160°, more preferably by 110° to 150°, can include a stop in a first intermediate position.

In an embodiment of the invention, the swab robot comprises a tube for swabbing the inside of the neck ring and/or a top surface of the neck ring.

In an embodiment of the invention, there is a drive which can move a support bracket of the tube, tilt a support bracket of the tube and/or rotate a support bracket of the tube about its longitudinal axis. The tube is attached at the support bracket.

In an embodiment of the invention, the invert mechanism includes a gripper which can grip the neck ring. The technical effort required to manufacture a container can thus be kept to a low level.

In an embodiment of the invention, the neck ring includes two neck ring halves, a blank mold of the blank station includes two blow mold halves and/or a blow mold of the blow mold station includes two halves. The halves are movable between a closed and an opened position. The technical effort required to manufacture a container can thus be kept to a low level.

In an embodiment of the invention, not only the neck ring is swabbed, but also the blank mold of the blank station. This can be done by the same swab robot. The control can be done by the already mentioned control device.

Swabbing and thus lubrication of the neck ring takes place when the ring does not hold a parison.

The invention aims at reliable swabbing of neck rings without imposing any residues on surrounding mechanisms. Avoiding the residues on the mechanisms (especially plunger mechanism) avoids the risk of creating container defects and mechanism malfunctions due to residues resulting from neck ring swabbing when neck rings are at the blank position.

Swabbing in the intermediate position is also a feature without the swabbing robot. Thus, the subject matter of an independent comprises a control device without the swabbing station. In this case, the control device is set up so that the neck ring stops or the speed of the neck ring is reduced when the neck ring is in an intermediate position between the blank station and the blow station. It can then be swabbed manually. In other words, this alternative refers to a special machine cycle which facilitates the life of an operator. This part of the invention may be combined with the other features of the invention which do not relate to the swabbing robot. For these reasons, an independent claim refers to a glass forming machine which includes a blank station for forming a parison from a gob of molten glass and a blow station for forming the parison into a container and an invert mechanism which can move a neck ring of the glass forming machine from the blank station to the blow station by a rotary motion and which further includes a control device, wherein the control device is set up so that the neck ring stops its movement or reduces its speed when the neck ring is in an intermediate position between the blank station and the blow station. An operator can swab the neck ring in the intermediate position easily due to the stop respectively due to the reduced speed.

The control device reduces the speed of the neck ring or stops the movement of the neck ring preferably only if the neck ring does not hold a blank since the neck ring can only be swabbed in this case.

The invention also refers to a method for swabbing a neck ring of a glass forming machine according to which swabbing is carried out in an intermediate position. The glass forming machine includes a blank station for forming a parison from a gob of molten glass and a blow station for forming the parison into a container and an invert mechanism which can move a neck ring from the blank station to the blow station by a rotary motion. Swabbing of the neck ring takes place when the neck ring is in an intermediate position between the blank station and the blow station. It can be swabbed manually or with the power of a swabbing robot. Preferably the neck ring does not move or the speed of the ring has been reduced when swabbing is carried out.

The invention also refers to a glass forming machine which includes a blank station for forming a parison from a gob of molten glass and a blow station for forming the parison into a container and an invert mechanism which can move a neck ring from the blank station to the blow station by a rotary motion. The glass forming machine further includes a replacement robot and a control device for the replacement robot. The control device is set up so that the replacement robot can replace the neck ring when the neck ring is in an intermediate position between the blank station and the blow station.

The intermediate position enables an automated replacement. A replacement can be done very quickly and easily to avoid production errors.

The glass forming machine can include both the swab robot and the replacement robot. The swab robot and the replacement robot can be one unit.

In an embodiment of the invention, the control device is set up so that the control device stops the neck ring when an arm holding the neck ring has been swiveled by 10° to 90°, preferably by 10° or 20° to 50° or to 70°, for replacing the neck ring. The neck ring is then automatically replaced. It has been found that in this position the neck ring can be replaced particularly easily and reliably.

The replacement robot may include a movable gripper through which a neck ring can be gripped in an appropriate manner. The gripper may be attached to a moving arm of the replacement robot. A control device may control the replacement robot in such a manner that the replacement robot may replace a neck ring automatically.

The invention also refers to a method for replacing a neck ring of a glass forming machine, wherein the glass forming machine includes a blank station for forming a parison from a gob of molten glass and a blow station for forming the parison into a container and an invert mechanism which can move a neck ring from the blank station to the blow station by a rotary motion. Replacement of the neck ring takes place when the neck ring is in an intermediate position between the blank station and the blow station. The replacement then takes place, in particular, automatically with the help of the replacement robot.

A neck ring can be automatically exchanged by a new and identical neck ring. This happens when the old neck ring is worn out. A neck ring can be automatically replaced by a differently shaped neck ring if a differently shaped container is to be produced.

A control device can be set up so that the control device stops rotation of the neck ring when an arm holding the neck ring has been swiveled by 10° to 70°. The neck ring is replaced when the control unit has stopped the rotation of the neck ring.

BRIEF DESCRIPTION OF THE SEVERAL VIEWS OF THE DRAWINGS

The invention is illustrated with the aid of the following example, with reference to the appended drawings in which.

The FIGS. 1 to 8 illustrate the production of a glass bottle. The FIGS. 9 and 10 illustrate the swabbing of a neck ring.

DETAILED DESCRIPTION OF THE INVENTION

Figure 1:
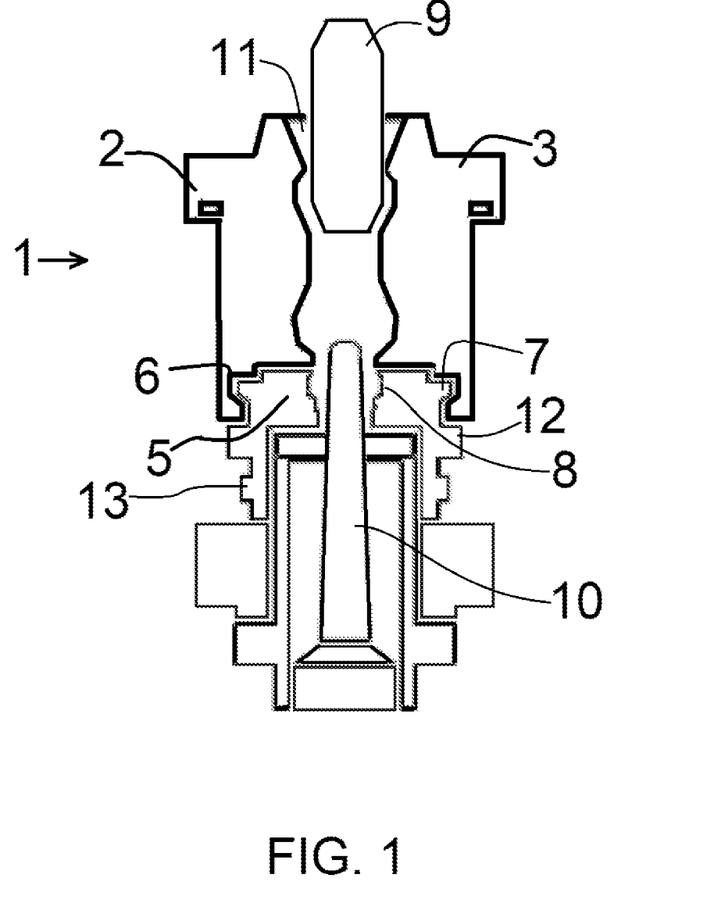
FIG. 1 is a schematic representation of a blank station at the beginning of the production of a parison.

FIG. 1 refers to a blank station of a glass forming machine. FIG. 1 shows one blank mold 1 of the blank station. The blank mold 1 includes two blank mold halves 2 and 3. The blank mold halves 2 and 3 are in a closed position. The two blank mold halves 2 and 3 are closed up on a neck ring 5 at the lower end of the blank mold 1.

There is an annular recess 6 formed by the two halves 2, 3 when the two halves 2 and 3 are in their closed position. The neck ring 5 comprises an upper annular projection 7. The upper annular projection 7 extends into the annular recess 6 when the two halves 2, 3 are in their closed position. In the closed position of the two halves 2, 3, these are then fixed by positive locking with the neck ring 5.

Figure 3:
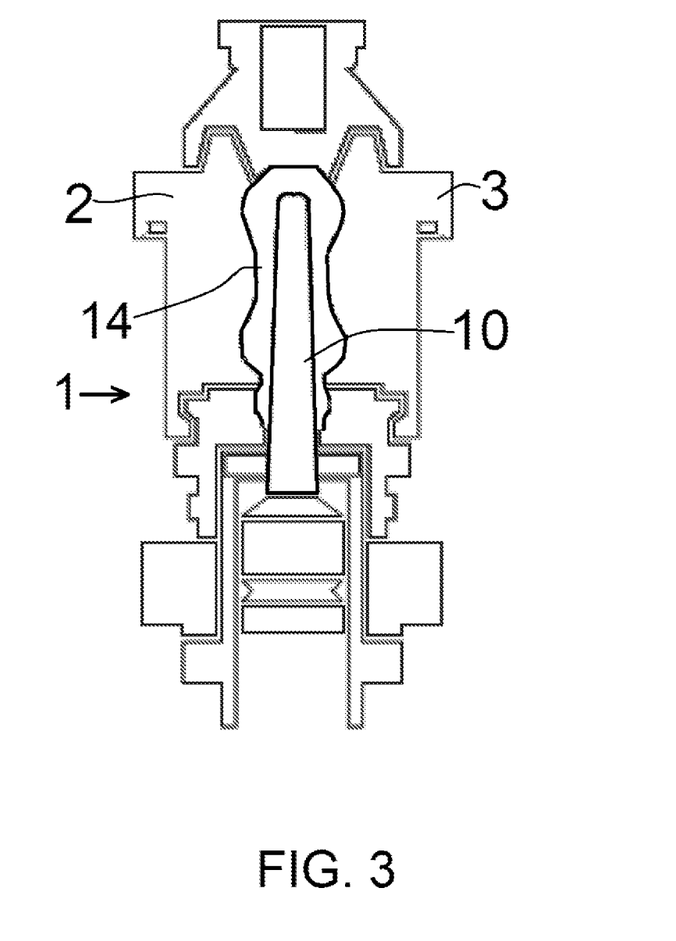
FIG. 3 is a schematic representation of the blank station at the end of the production of a parison.

The inner wall of the neck ring 5 can have a bulge 8. A parison can be held by this bulge 8, as shown in FIG. 3.

As shown in FIG. 1, a gob of molten glass 9 can be brought into the blank mold from above by gravity.

The blank station includes a plunger 10. According to FIG. 1, the plunger 10 is in an initial position. The plunger 10 reaches through the neck ring 5. The plunger 10 tapers in the direction of the mold 1. When the plunger 10 is in the initial position the plunger 10 ends close to the bottom of the mold 1 as well as above the bottom of the mold 1 as shown in FIG. 1.

So that the gob of molten glass 9 can be moved into the mold 1 by gravity, the mold 1 has an upper opening 11 on the upper side.

The neck ring 5 can include a flange 12 on which the mold 1 can rest. Further, the neck ring 5 can include a lower annular projection 13 in order to be able to connect the neck ring 5 positively with an arm of an invert mechanism.

Figure 2:
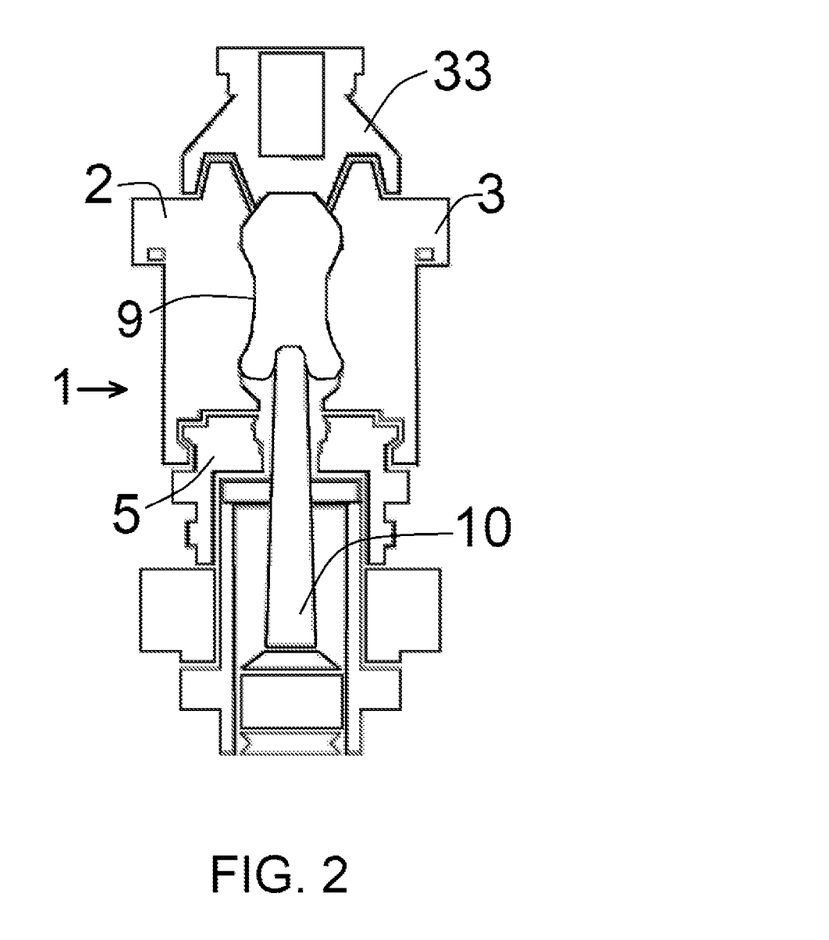
FIG. 2 is a schematic representation of the blank station during the production of a parison.

As soon as the gob of molten glass 9 is completely in the mold 1, the upper opening 11 of the mold 1 is closed by a baffle 33 as shown in FIG. 2. After the upper opening 11 has been closed, the plunger 10 is moved upwards, i.e. further into the mold 1. This upward movement of the plunger 10 is illustrated in FIGS. 2 and 3. The gob of molten glass 9 thus becomes a parison 14. The parison 14 is shown in FIG. 3.

Once the parison 14 has been formed, the mold is opened. The baffle 33 and the two halves 2 and 3 of the mold 1 are removed from the parison 14. The parison 14 remains on the neck ring 5. Further, the parison 14 is held by the bulge 8 of the neck ring 5. For example, the baffle 33 is pulled out of the parison 14 first. After that the two halves will be moved away.

Figure 4:
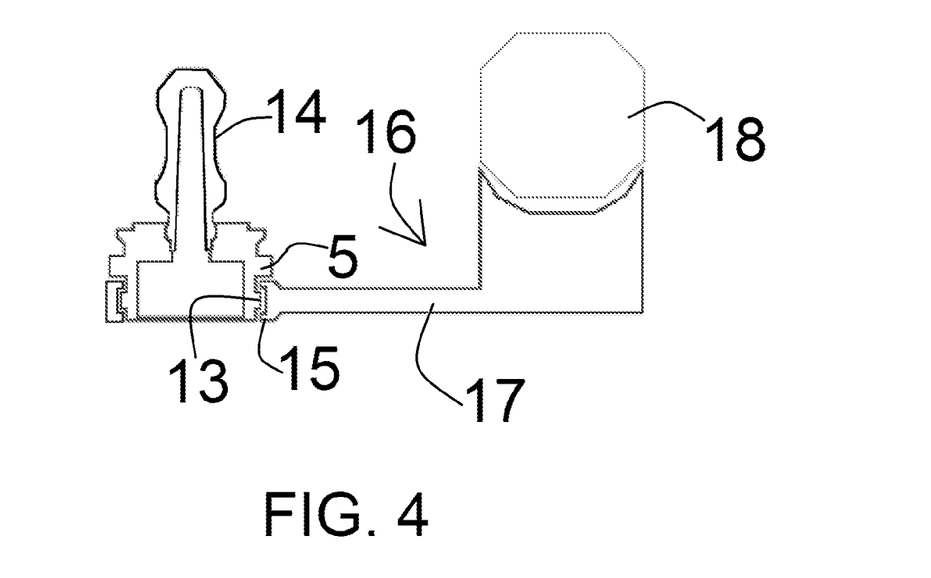
FIG. 4 is a schematic representation of an invert mechanism at the beginning of a transfer of the parison.

A gripper 15 of an invert mechanism 16 then grips for example the lower projection 13 of the neck ring 5 as illustrated in FIG. 4. The gripper 15 is attached to an L-shaped arm 17 of the invert mechanism 16. The L-shaped arm 17 can be rotated about one axis 18. The rotation is done by means of a motor. The motor is not shown in FIG. 4.

Figure 5:
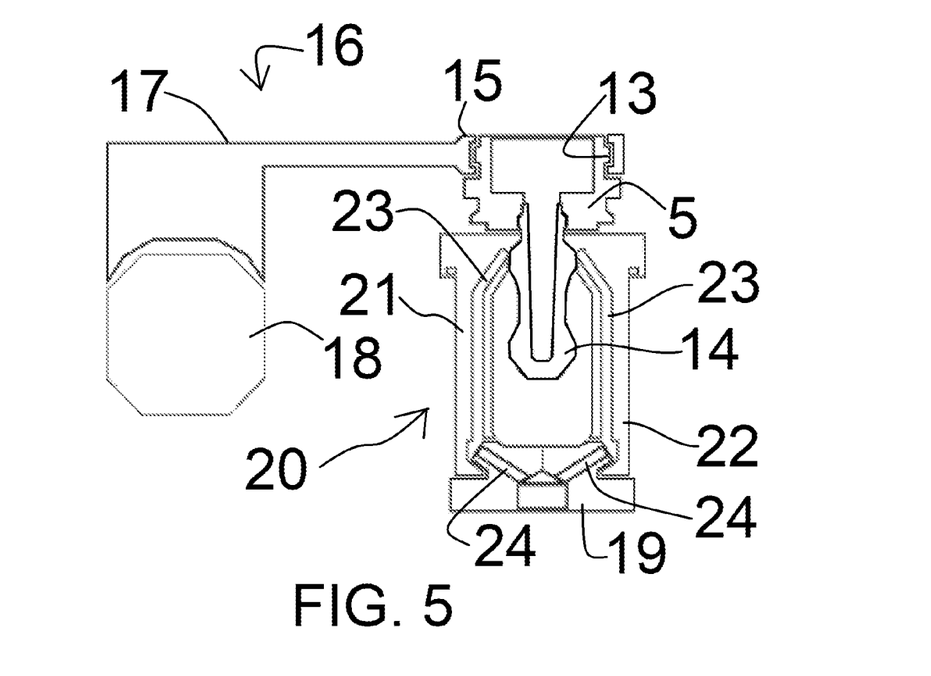
FIG. 5 is a schematic representation of the invert mechanism at the end of a transfer of the parison.

After the gripper 15 has gripped the neck ring 5, the L-shaped arm 17 is rotated 180° around the axis 18. FIG. 5 shows this rotated state. The parison 14 is thus brought to a base 19 of a blow station 20. The parison 14 is then located above this base 19.

The blow station 20 comprises a blow mold which includes two blow mold halves 21 and 22. After the parison 14 has been brought to the base 19, the two halves 21 and 22 are moved to the parison 14. Subsequently, the parison 14 is inside the blow mold 21, 22 as shown in FIG. 5.

Figure 6:
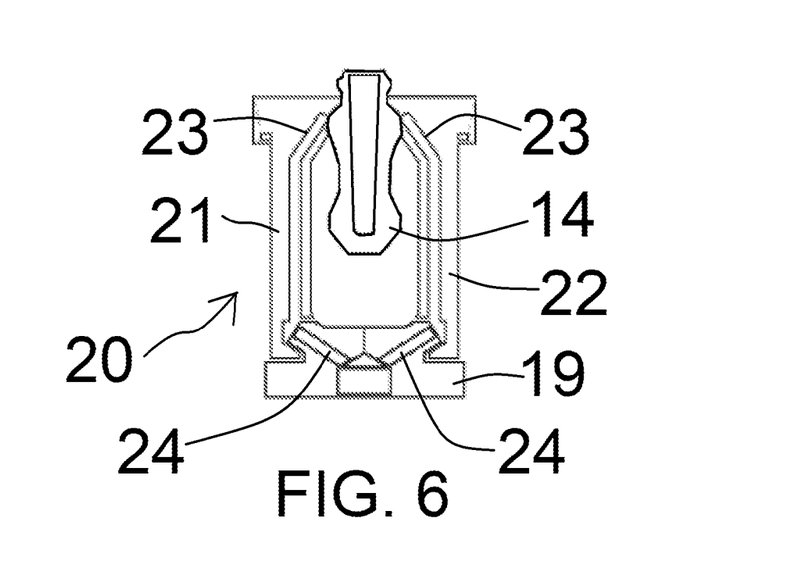
FIG. 6 is a schematic representation of a blow station at the beginning of the production of a glass bottle.

When the parison 14 is inside the blow mold 21, 22, the neck ring 5 is removed. To do this without damaging the parison 14, the neck ring 5 also includes two halves. The two halves of the neck ring 5 can therefore be removed from each other to remove the neck ring 5 from the parison 14 as illustrated in FIG. 6.

The two halves 21 and 22 include a double wall. A gap 23 remains between the two walls of the double wall. The inner wall of the double wall is perforated or otherwise air-permeable. The base 19 comprises ducts 24 through which air can be sucked out of each gap 23.

Figure 7:
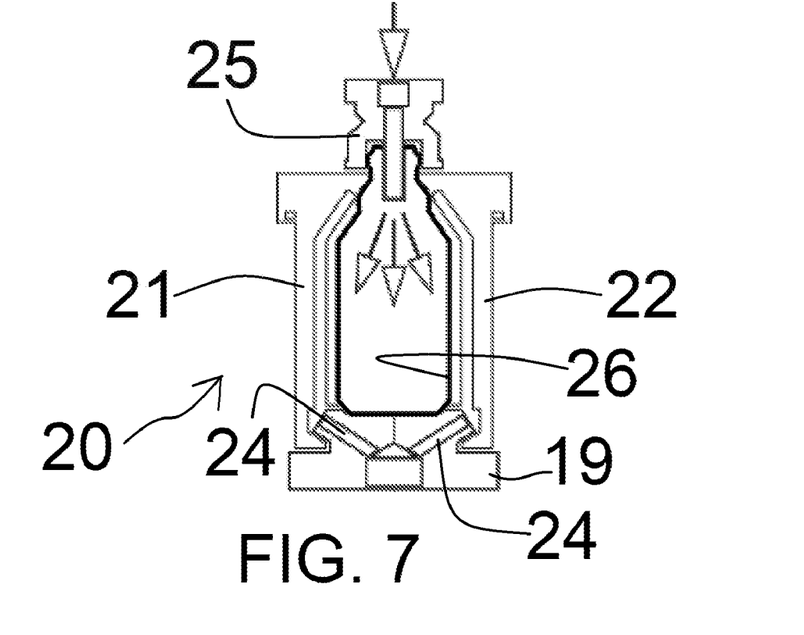
FIG. 7 is a schematic representation of the blow station at the end of the production of the glass bottle.

A blow head 25 is then placed on the two halves 21 and 22 of the blow mold. Air is then pumped through the blow head 25, inflating the parison into a bottle 26, as shown in FIG. 7. Inflating can be supported by sucking air through the ducts 24.

Figure 8:
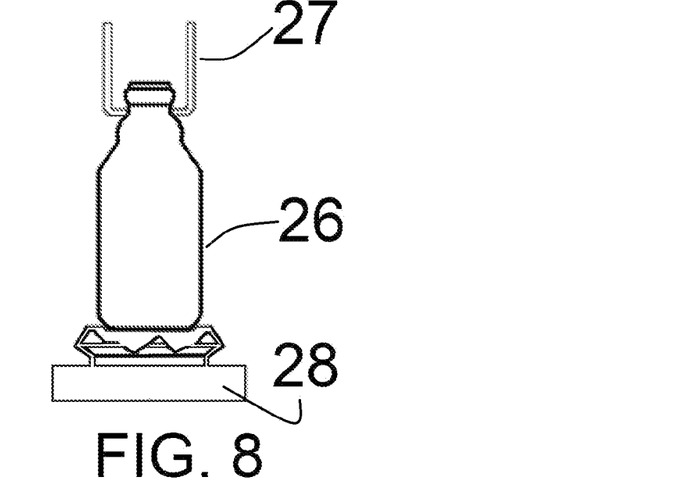
FIG. 8 is a schematic representation of the glass bottle.

After the bottle 26 has been inflated, the blow head as well as the two halves 21 and 22 of the blow mold are removed. The bottle 26 can then be gripped by a take out 27 and placed on a conveyor belt 28, for example, as illustrated in FIG. 8.

Figure 9:
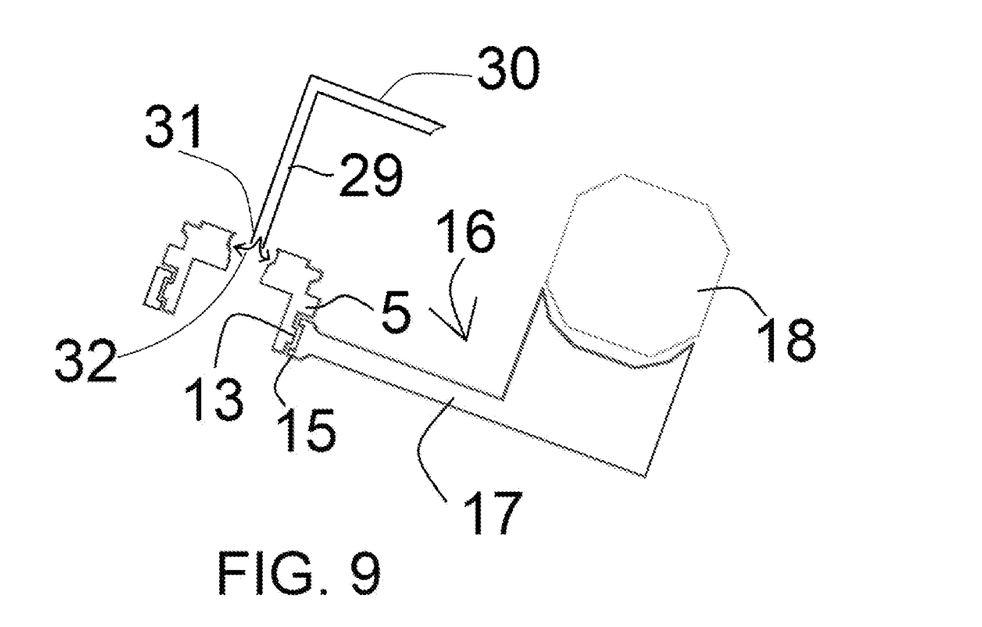
FIG. 9 is a schematic representation of the invert mechanism in a first intermediate position.

If the neck ring 5 is to be swabbed, only the neck ring 5 is rotated from one station in the direction of the other station by the invert mechanism 16. However, it is not rotated by 180°. Instead, for example, it is initially rotated by 10-90°. Then the rotation stops. Now the tube 29 of a swab robot moves towards the ring until the tube 29 at least reaches the neck ring 5. Then a lubricant 32 such as oil is pumped through the tube 29. In this way, the inside of the neck ring 5 is sprayed with the lubricant 32. The lubricant 32 can be sprayed with the tube 29. This creates a spray mist that reaches the inside of the neck ring 5. Alternatively, the lubricant 32 can be deflected at the end of the tube 29. Such swabbing is shown in FIG. 9.

Preferably the tube 29 is connected to a support bracket 30. Preferably, the tube 29 includes an angle of less than 180° with the support bracket 30. More preferably, this angle is 90°. Preferably, the support bracket 30 can be moved, tilted and/or rotated about its longitudinal axis by a drive.

With little construction space and little technical effort, the open end 31 of the tube 29 can then be quickly brought to the desired position.

Figure 10:
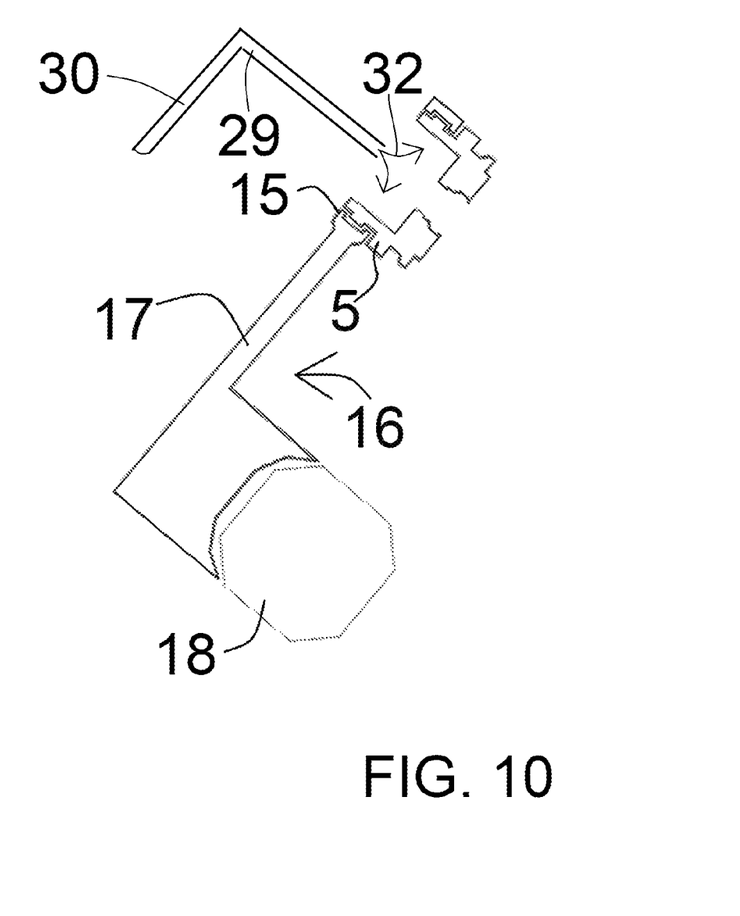
FIG. 10 is a schematic representation of the invert mechanism in a second intermediate position.

When the neck ring 5 has been swabbed from one front side, the neck ring 5 is rotated further until the neck ring 5 can be swabbed from the other back side, as shown in FIG. 10.

A corresponding control device which is not shown in the figures is set up so that the control device stops the neck ring 5 when an arm respectively a leg of the invert mechanism 16 holding the neck ring 5 has been swiveled by 10° to 90° as shown in FIG. 9. Before the swivel, the arm was at the side of the blank station.

The control device is set up so that the control device stops the neck ring when the arm respectively the leg holding the neck ring 5 has been swiveled by 90° to 170°, as shown in FIG. 10. Before the swivel, the arm was at the side of the blank station.

In this way, particularly suitable swabbing can be provided without having to fear damage.

Figure 11:
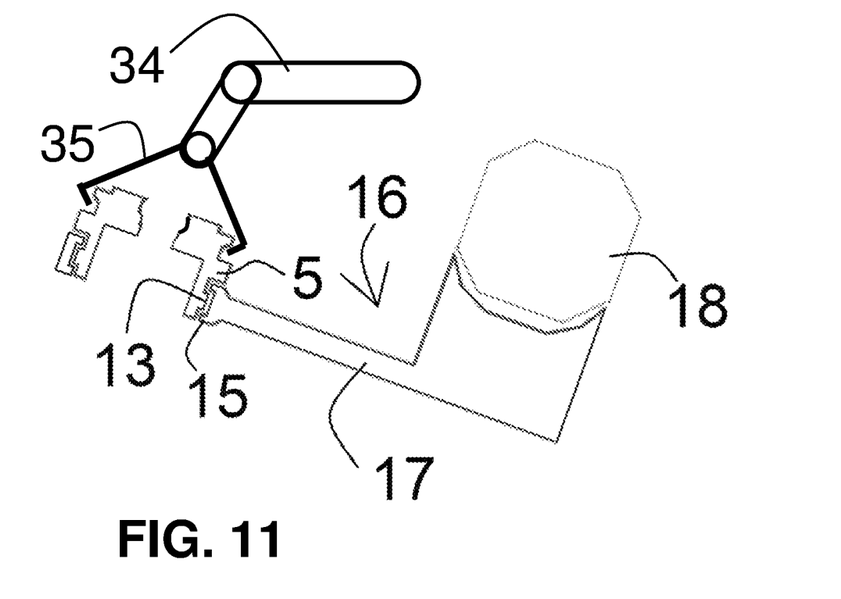
FIG. 11 is a schematic representation of the invert mechanism in a first intermediate position in order to replace a neck ring.

FIG. 11 shows a moving arm 34 of a replacement robot. At the end of the moving arm 34 there is a gripper 35. A control device which is not shown is set up so that the control device stops the rotation of the neck ring 5 when an arm respectively a leg of the invert mechanism 16 holding the neck ring 5 has been swiveled by 10° to 70° as shown in FIG. 11. Then, the gripper 35 grips the neck ring 5 and then removes neck ring 5. Then a neck new ring 5 is gripped by the gripper 35 to bring it into the position shown in FIG. 9. In this way, replacement of the neck ring 5 may take place.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. Glass forming machine comprising:
    a blank station for forming a parison from a gob of molten glass,
    a blow station for forming the parison into a container,
    an invert mechanism which can move a neck ring from the blank station to the blow station by a rotary motion, the said rotary motion between the blank station and the blow station is one single rotary motion taking place within only one plane,
    a control device set up so that the neck ring stops its rotary motion within said one plane or reduces its speed of rotary motion within said one plane when the neck ring is in an intermediate position between the blank station and the blow station,
    and a swab robot, wherein the control device is set up so that the swab robot swabs the neck ring when the neck ring is in the intermediate position between the blank station and the blow station.

2. Glass forming machine according to claim 1 comprising two intermediate positions for swabbing the neck ring from a front side and from a back side.

3. Glass forming machine according to claim 2 wherein the control device is set up so that the control device stops the neck ring in at least one intermediate position or reduces the speed of the neck ring in at least one intermediate position.

4. Glass forming machine according to claim 1 wherein the control device is set up so that the control device stops the neck ring or reduces the speed of the neck ring when an arm holding the neck ring has been swiveled by 10° to 90° for swabbing the neck ring from a front side.

5. Glass forming machine according to claim 1 wherein the control device is set up so that the control device stops the neck ring or reduces the speed of the neck ring when an arm holding the neck ring has been swiveled by 90° to 170° for lubricating the neck ring from a back side.

6. Glass forming machine according to claim 1 wherein the invert mechanism includes a servo-electric drive in order to transfer the neck ring.

7. Glass forming machine according to claim 1 wherein the invert mechanism includes a gripper which can grip the neck ring.

8. Glass forming machine according to claim 1 wherein the swab robot comprises a tube for swabbing the inside of the neck ring and/or a top surface of the neck ring.

9. Glass forming machine according to claim 8 comprising a drive which can move a support bracket of the tube, tilt a support bracket of the tube and/or rotate a support bracket of the tube about its longitudinal axis.

10. Glass forming machine according to claim 1 wherein the neck ring includes two neck ring halves, a blank mold of the blank station includes two blow mold halves and/or a blow mold of the blow mold station includes two blow halves.

11. Glass forming machine according to claim 1 wherein the blank station comprises a movable plunger for forming a parison.

12. Glass forming machine according to claim 1 wherein the blow station comprises a blowing device to blow up a parison when the parison is in a blow mold.

13. Glass forming machine according to claim 1 wherein the blow station includes a suction device to assist forming the parison into a container and wherein the blow mold includes a double wall, leaving a gap between the two walls of the double wall, and wherein the inner wall of the double wall is at least in part permeable to air.

14. Glass forming machine according to claim 1 which further includes a replacement robot, wherein the control device is set up so that the replacement robot can replace the neck ring when the neck ring is in the intermediate position between the blank station and the blow station.

15. Glass forming machine according to claim 14 wherein the control device is set up so that the control device stops the neck ring when an arm holding the neck ring has been swiveled by 10° to 90° for replacing the neck ring.

16. Glass forming machine according to claim 15 wherein the replacement robot includes a moving arm and a gripper through which a neck ring can be gripped.

17. Glass forming machine according to claim 1 wherein the neck ring comprises one and only one neck ring moved back-and-forth between the blank station and the blow station by rotary motion taking place within one plane.

\* \* \* \* \*